United States Patent
Sumiuchi

(10) Patent No.: US 6,992,783 B1
(45) Date of Patent: *Jan. 31, 2006

(54) IMAGE PROCESSING APPARATUS AND METHOD

(75) Inventor: Kazuyoshi Sumiuchi, Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/342,926

(22) Filed: Jun. 30, 1999

(30) Foreign Application Priority Data

Jul. 2, 1998 (JP) ............................................. 10-187741

(51) Int. Cl.
*G06F 3/12* (2006.01)
*G06F 13/00* (2006.01)

(52) U.S. Cl. ....................................... 358/1.15; 358/1.9
(58) Field of Classification Search ................ 358/1.15, 358/1.9, 3.23, 515, 518, 525, 3.07, 504, 512, 358/418, 3.26; 382/166, 167
See application file for complete search history.

(56) References Cited

U.S. PATENT DOCUMENTS

| | | | | |
|---|---|---|---|---|
| 5,317,426 A | * | 5/1994 | Hoshino | ..................... 358/515 |
| 6,072,464 A | | 6/2000 | Ozeki | ......................... 345/154 |
| 6,108,008 A | * | 8/2000 | Ohta | ........................... 345/431 |
| 6,151,025 A | * | 11/2000 | Yen et al. | .................... 345/418 |
| 6,204,933 B1 | * | 3/2001 | Yoshino et al. | .............. 358/1.9 |
| 6,442,662 B1 | * | 8/2002 | Komatsu | ..................... 711/202 |

FOREIGN PATENT DOCUMENTS

| | | |
|---|---|---|
| EP | 0 605 892 A1 | 7/1994 |
| JP | 2-87192 | 3/1990 |
| JP | 7-021356 | 1/1995 |
| JP | 8-138030 | 5/1996 |
| JP | 9-193477 | 7/1997 |
| JP | 9-321996 | 12/1997 |
| JP | 10-173951 | 6/1998 |

OTHER PUBLICATIONS

"Display Imaging", SCI, vol. 2, No. 1, 1993 (pp. 17–25).
JP Office Action in JP 10–187741 (not enclosed herewith).

* cited by examiner

*Primary Examiner*—Douglas Q. Tran
(74) *Attorney, Agent, or Firm*—Fitzpatrick, Cella, Harper & Scinto

(57) ABSTRACT

In a color ink-jet printer using seven colors of ink including C, M, Y and K and c, m and y having low density, the data size of a conversion table used in color conversion is large. In view of this, compressed conversion table data, having compressed grid point data of a conversion table arranged by color components which are used to construct image data, is stored in a compressed data buffer. Then, the compressed conversion table data is expanded by a data restoration unit. Then, color conversion processor performs color conversion on inputted image data by interpolation operation based on the expanded conversion table data.

9 Claims, 9 Drawing Sheets

FIG. 2B

| GRID POINT NUMBER | R | G | B |
|---|---|---|---|
| 0 | 0 | 0 | 0 |
| 1 | 0 | 0 | 64 |
| 2 | 0 | 0 | 128 |
| 3 | 0 | 0 | 192 |
| 4 | 0 | 0 | 255 |
| 5 | 0 | 64 | 0 |
| 6 | 0 | 64 | 64 |
| ... | ... | ... | ... |
| 120 | 255 | 255 | 0 |
| 121 | 255 | 255 | 64 |
| 122 | 255 | 255 | 128 |
| 123 | 255 | 255 | 192 |
| 124 | 255 | 255 | 255 |

FIG. 2C

| GRID POINT NUMBER | C | M | Y | K |
|---|---|---|---|---|
| 0 | 0 | 0 | 0 | 255 |
| 1 | 64 | 64 | 0 | 191 |
| 2 | 128 | 128 | 0 | 127 |
| 3 | 192 | 192 | 0 | 63 |
| 4 | 255 | 255 | 0 | 0 |
| 5 | 64 | 0 | 64 | 191 |
| 6 | 64 | 0 | 0 | 191 |
| ... | ... | ... | ... | ... |
| 120 | 0 | 0 | 255 | 0 |
| 121 | 0 | 0 | 191 | 0 |
| 122 | 0 | 0 | 127 | 0 |
| 123 | 0 | 0 | 63 | 0 |
| 124 | 0 | 0 | 0 | 0 |

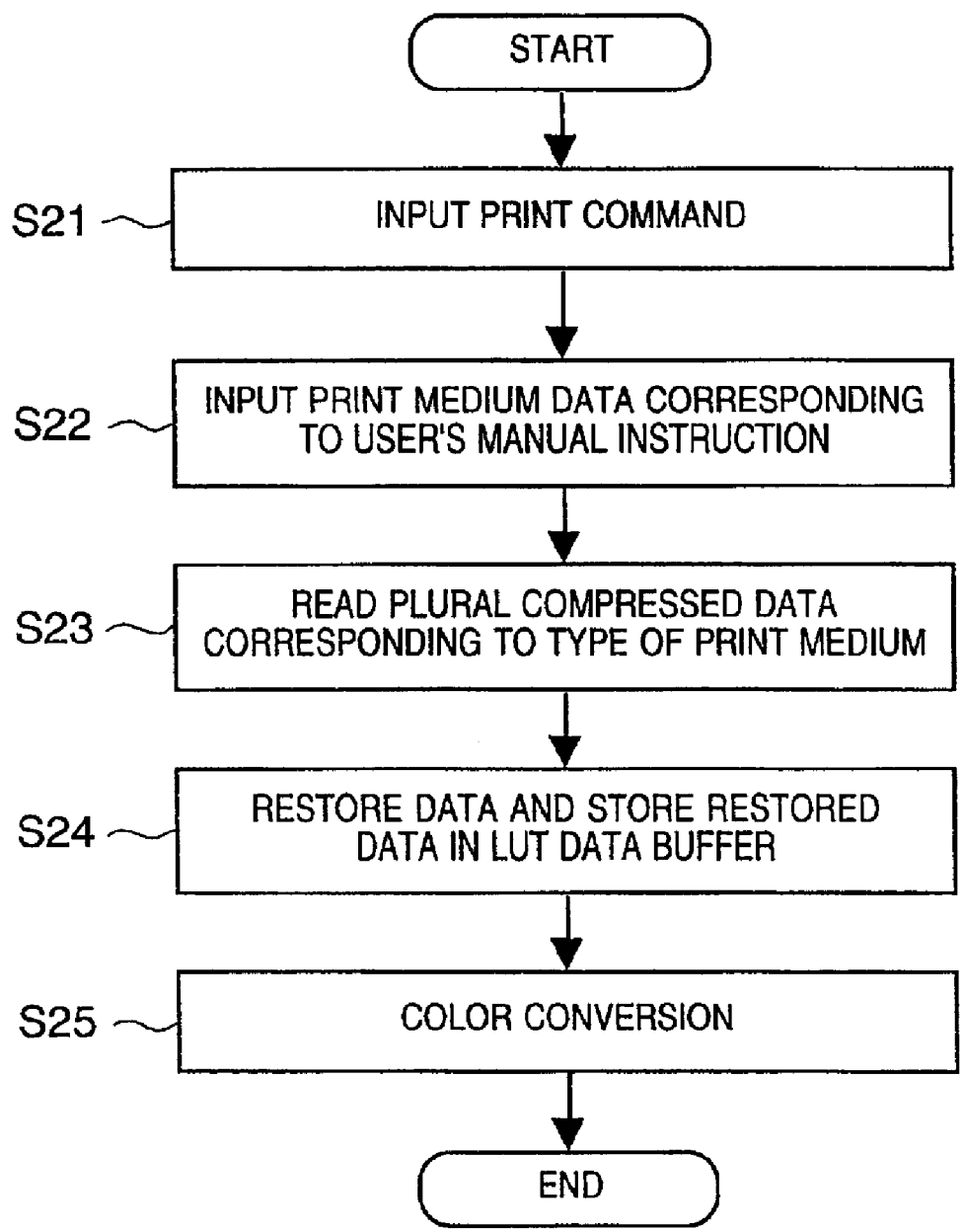

IMAGE PROCESSING APPARATUS AND METHOD

BACKGROUND OF THE INVENTION

The present invention relates to an image processing apparatus and method thereof, and more particularly, to an image processing apparatus and method thereof for performing conversion processing on image data by interpolation operation based on a conversion table, and a recording medium where data related to the image processing is recorded.

When image output is performed by a color printer or the like, color conversion is necessary. For instance, when R, G and B image data representing an image displayed on a computer monitor is outputted to a color ink-jet printer, the R, G and B image data need to be converted to C, M, Y and K signals for expressing ink colors used by the color ink-jet printer. As a color conversion method, matrix operation has conventionally been employed.

However, color conversion utilizing matrix operation has well-known disadvantages, such as insufficient color representation. For instance, when colors of an image displayed on a monitor are converted to colors of a printing image, color conversion characteristics must be precisely simulated. However, color conversion using matrix operation is far from satisfactory for such requirement.

In view of this, a lookup table interpolation method is available where a color conversion table is prepared in advance, and converted image data is obtained by interpolation operation based on the conversion table. For instance, Display and Imaging (SCI, Volume 2, Number 1, 1993, p17–25) discloses cubic interpolation using eight neighboring points, prism interpolation using six neighboring points, tetrahedron interpolation using four neighboring points and so on.

When such interpolation using a lookup table (LUT) is performed, there is a disadvantage in that the data size for a LUT becomes large. For instance, in the interpolation processing for outputting C, M, Y and K image data, assuming that a conversion table is divided into 16 grid points, wherein each color component data at each grid point has 8 bits, data having 4×17×17×17=19652 bytes are necessary.

Furthermore, in the case of a color ink-jet printer which realizes high precision image quality, seven colors of ink, including three c, m and y low density colors in addition to the conventional four colors (C, M, Y and K), are used. Therefore, the LUT data size for color conversion is further increased.

SUMMARY OF THE INVENTION

The present invention is made in consideration of the above situation, and has as its object to provide an image processing apparatus and method thereof which can keep the memory capacity necessary for storing a conversion table for image data conversion small, and a recording medium.

To attain the above object, the present invention provides an image processing apparatus for generating image data to be outputted by using data conversion, the apparatus comprising: first storage means for storing compressed conversion table data having compressed grid point data of a conversion table arranged by color components which are used to construct the image data to be outputted; expansion means for expanding the compressed conversion table data; and conversion means for performing the data conversion by interpolation operation based on the expanded conversion table data.

Furthermore, the present invention provides an image processing method for generating image data to be outputted by using data conversion, the method comprising the steps of: expanding compressed conversion table data having compressed grid point data of a conversion table arranged by color components which are used to construct the image data to be outputted; and performing the data conversion by interpolation operation based on the expanded conversion table data.

Furthermore, the present invention provides a data processing method for processing data used in data conversion, the method comprising the steps of: inputting conversion table data where combinations of plural color component data are arranged by grid points; sorting the conversion table data in a color component unit; and compressing the sorted conversion table data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2B and 2C are tables showing input data for each grid point in a conversion table;

FIG. 7 is a flowchart showing a process according to a second embodiment of the present invention.

DETAILED DESCRIPTION OF THE PREFERRED EMBODIMENTS

Preferred embodiments of the present invention will be described in detail in accordance with the accompanying drawings.

[First Embodiment]

Figure 1:
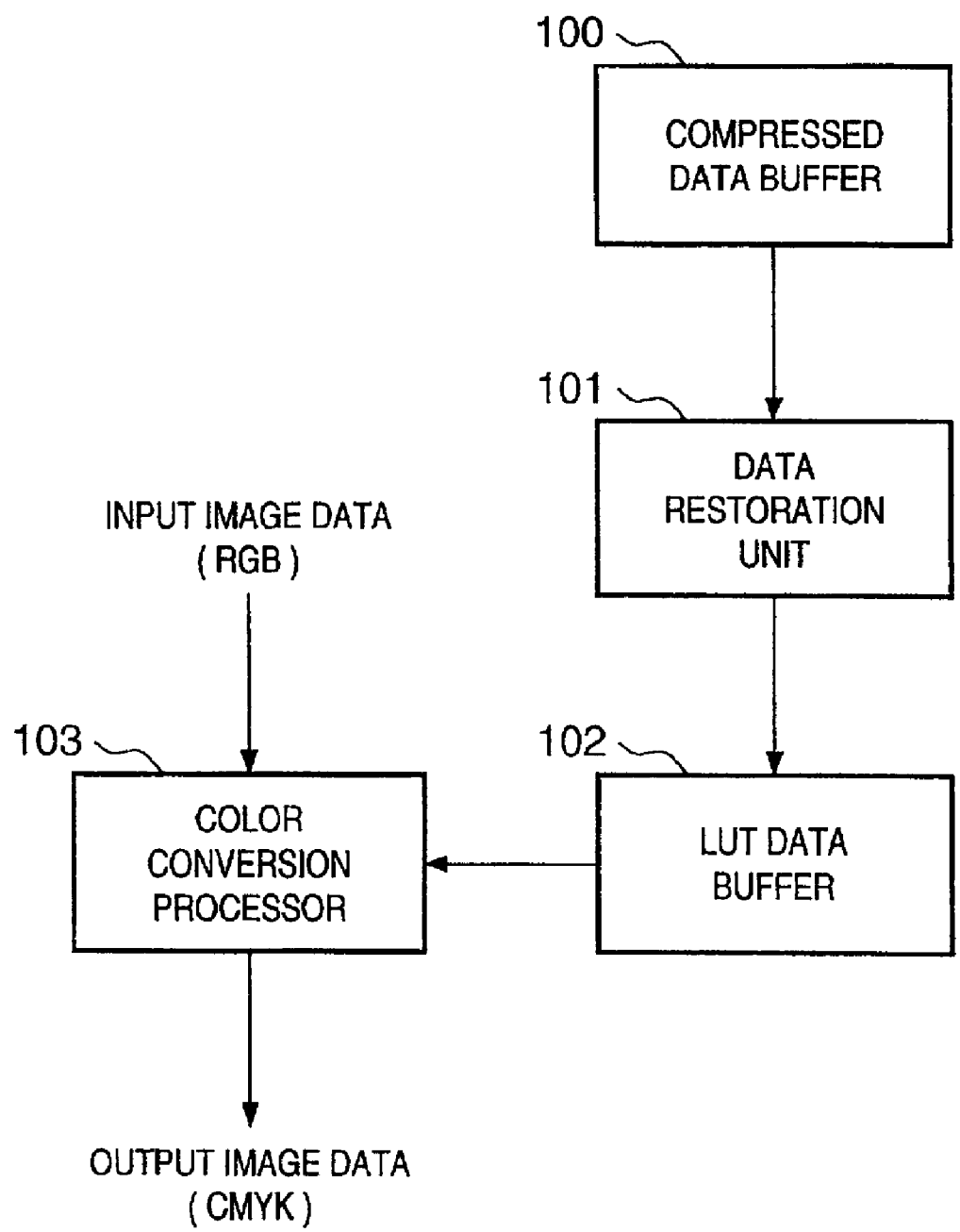
FIG. 1 is a block diagram showing an image processing apparatus according to an embodiment of the present invention.

FIG. 1 is a block diagram showing a construction of an image processing apparatus according to the present embodiment.

Reference numeral 100 denotes a compressed data buffer where compressed LUT data is stored; 101, a data restoration unit for expanding (restore) the compressed LUT data; 102, a LUT data buffer where the restored LUT data is stored; and 103, a color conversion processor where C, M, Y and K output image data is generated by performing interpolation operation on R, G and B input image data based on the LUT data stored in the LUT data buffer 102.

Figure 6:
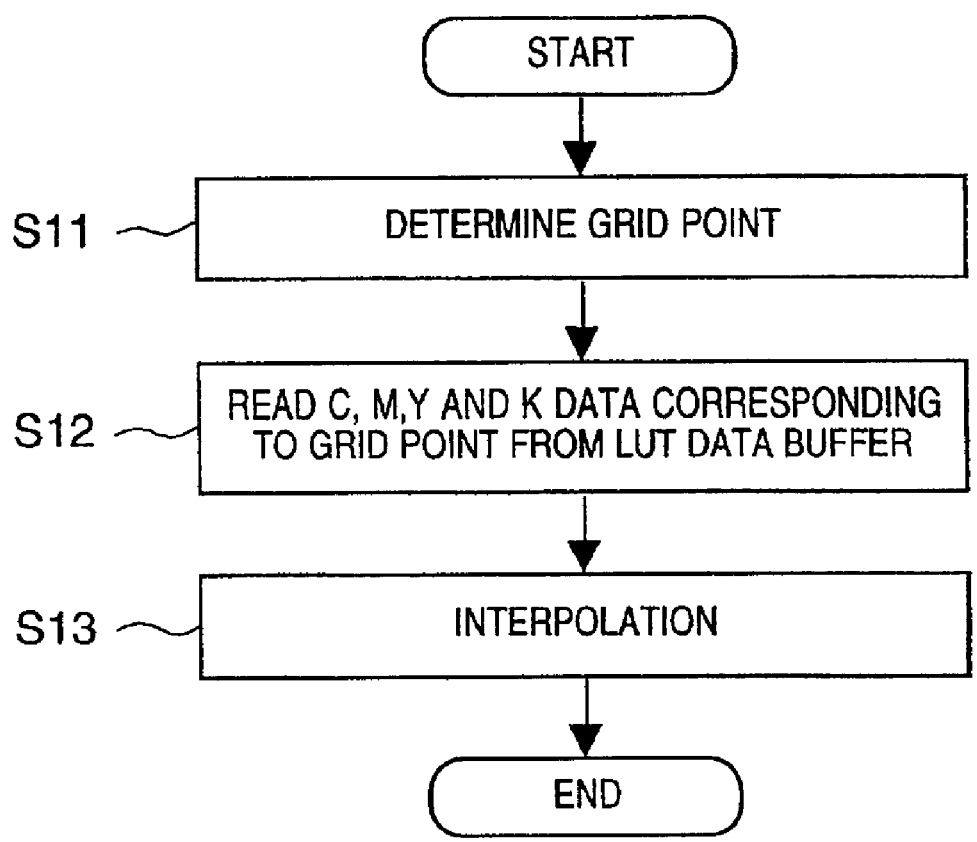
FIG. 6 is a flowchart showing image processing executed by a color conversion processor.

FIG. 6 is a flowchart showing image processing executed by the color conversion processor 103. In step S11, it is determined based on input R, G and B image data that to which of the interpolation solids (small cubes) shown in FIG. 2A the input image data belongs. In accordance with the determination result, eight grid points necessary for interpolation, i.e., the grid point numbers corresponding to vertices of the interpolation solid, are obtained. Then in step S12, a plurality of grid point data (C, M, Y and K data) corresponding to the obtained grid point numbers are read out of the LUT data buffer 102. In step S13, cubic interpolation for each of the C, M, Y and K color components is performed with the use of the read plurality of grid point data and input image data, and C, M, Y and K output image data are generated.

Figure 4:
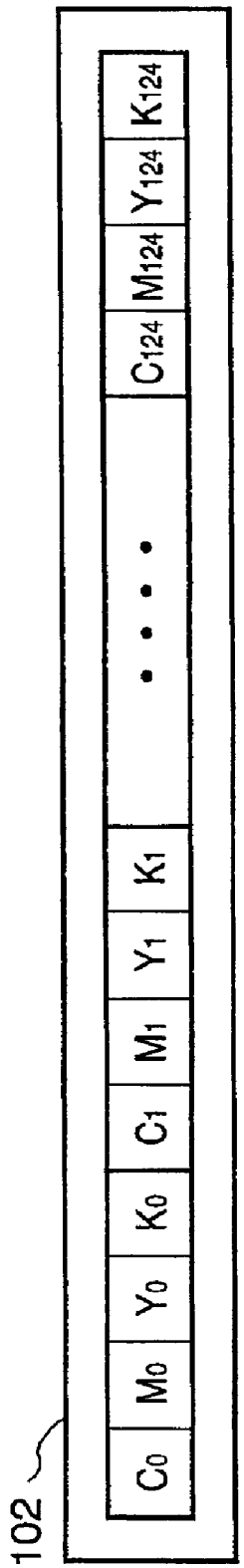
FIG. 4 is a data configuration stored in a LUT data buffer.

In the LUT data buffer 102, the combination of C, M, Y and K data corresponding to the same grid point are arranged by grid point numbers as shown in FIG. 4. By arranging the data as shown in FIG. 4, grid point data necessary for interpolation operation can readily be read. In the present embodiment, one grid point data consists of four bytes. Grid point data for the grid point number i is obtained by reading, from the LUT data buffer 102, four bytes of data positioned at the 4i-th from the head address of the LUT data buffer 102. In other words, four bytes of C, M, Y and K data corresponding to one grid point number can be read in single reading operation.

The data restoration unit 101 and color conversion processor 103 are realized by, for instance, supplying a CPU with a program stored in ROM. Alternatively, image processing according to the present embodiment can also be realized by a driver which supplies a personal computer with a program. In these cases, the LUT data buffer 102 may be allocated in the RAM or the like serving as a CPU work memory. The compressed data buffer 100 may be stored in a non-volatile memory such as hard disk or the like.

Image data is inputted to the color conversion processor 103 by an image input device such as an image reader, film reader, digital still camera, or digital video camera or the like, or a storage device including a storage medium such as a magnetic disk or optical disk or the like, through a predetermined interface. Image data is outputted by the color conversion processor 103 to an image output device such as a CRT or LCD monitor, printer, film recorder or the like, or a storage device including a storage medium such as a magnetic disk or optical disk or the like, through a predetermined interface. Moreover, image data may be exchanged with a computer device, connected to the aforementioned image input/output devices or storage device, through a network interface card (NIC). Such network includes, for instance, Ethernet, a network using Fiber Distributed Data Interface (FDDI), a serial bus conforming to the IEEE 1394 or Universal Serial Bus (USB) or the like.

Generation Method of Conversion Table

Described hereinafter is complementary color inversion processing for converting RGB color space of input image data to CMYK color space of output image data, and a generation method of a conversion table for each color component, for performing 100% under color removal (UCR). Assume that each color component data is expressed by 8 bits (0 to 255).

$$K = 255 - MAX(R, G, B) \quad (1)$$

$$C = (255 - R) - K \quad (2)$$

$$M = (255 - G) - K \quad (3)$$

$$Y = (255 - B) - K \quad (4)$$

where function MAX( ) outputs a maximum value

Figure 2A:
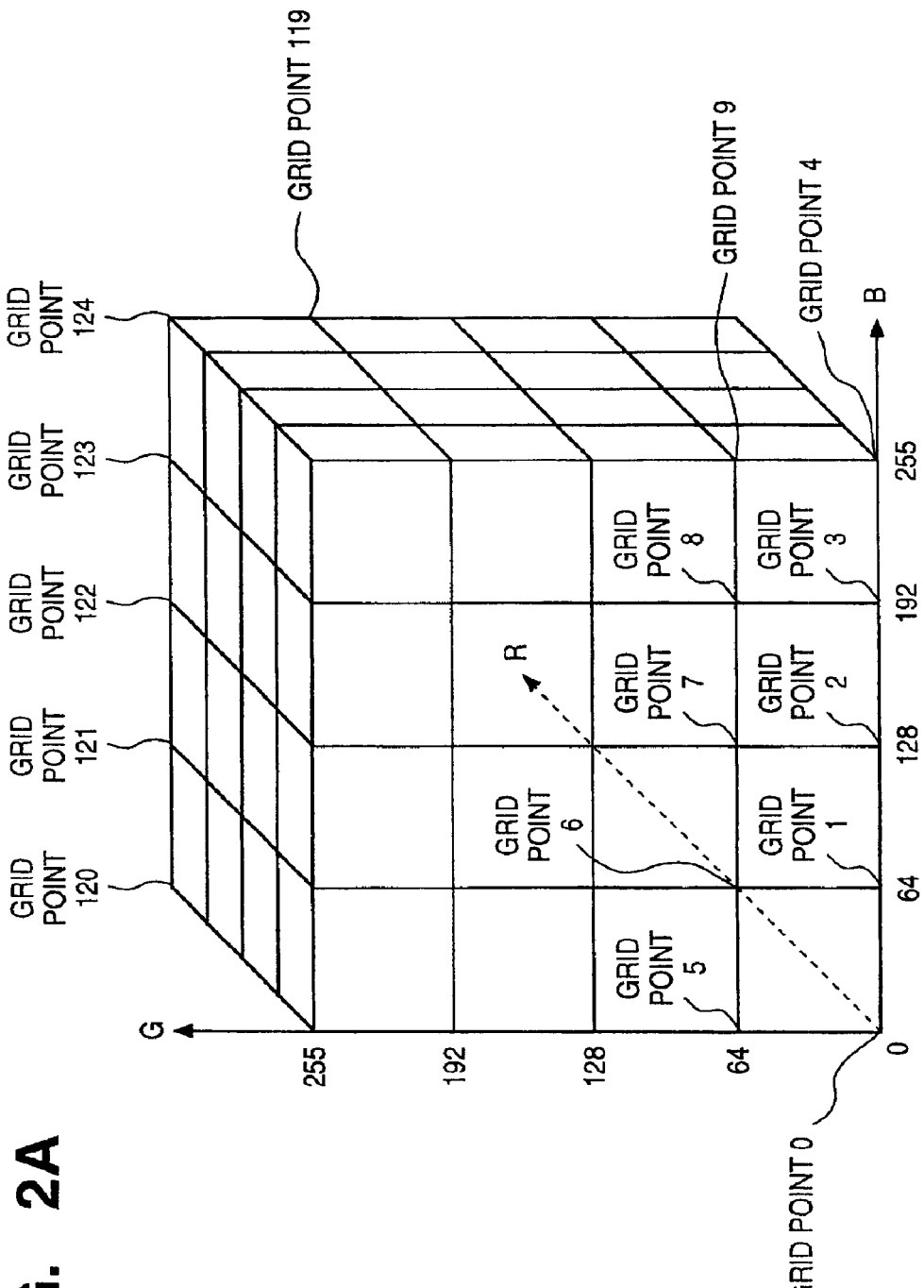
FIG. 2A is an example of coordinate setting in a conversion table.

FIG. 2A shows an example of coordinate setting in a conversion table, and FIG. 2B shows an example of input data for each grid point in a conversion table. Output data corresponding to each grid point data on a one-to-one basis as shown in FIG. 2B is obtained by equations (1) to (4) and is shown in FIG. 2C. The LUT data, indicative of corresponding relations between the grid point numbers and output data (C, M, Y and K) as shown in FIG. 2C, is compressed and stored in the compressed data buffer 100.

The LUT data, compressed and stored in the compressed data buffer 100, is restored to LUT data as shown in FIG. 4 by the data restoration unit 101 as necessary, and stored in the LUT data buffer 102.

Figure 3:
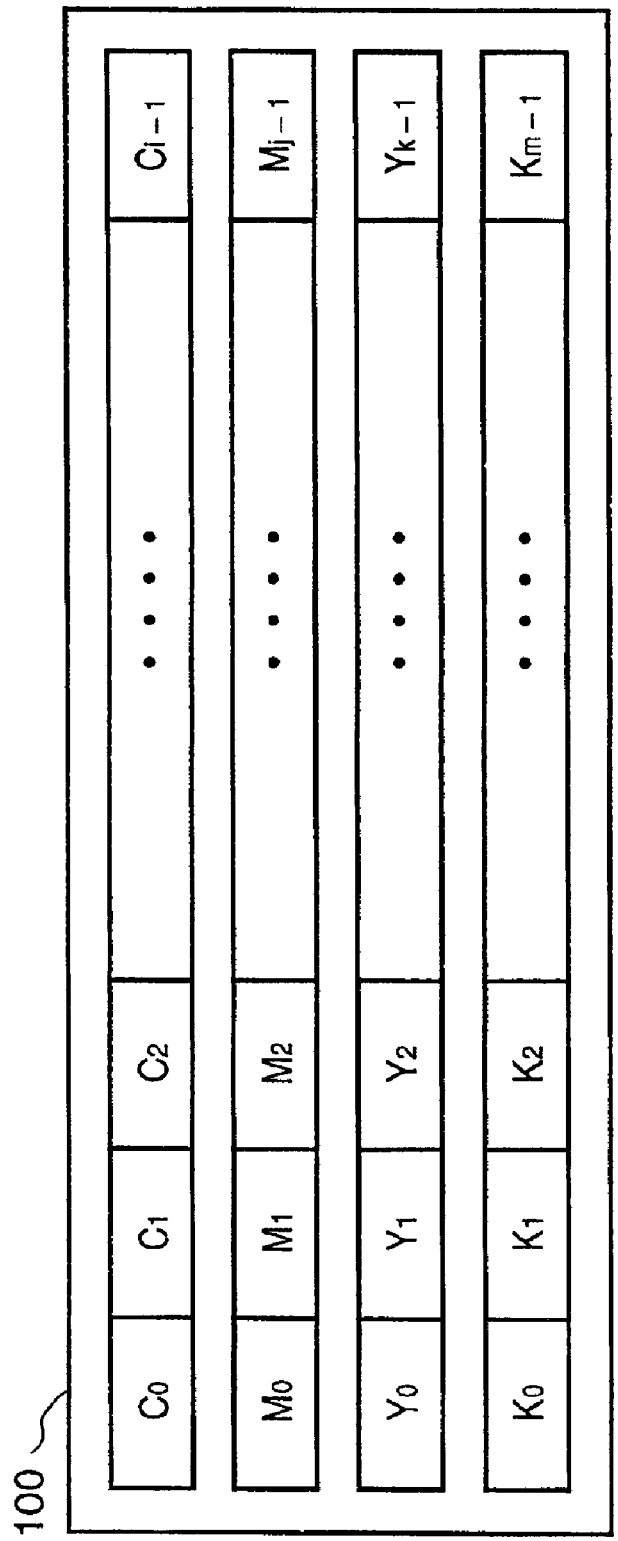
FIG. 3 is an explanatory view of data arrangement in compressed conversion table data.
Figure 5:
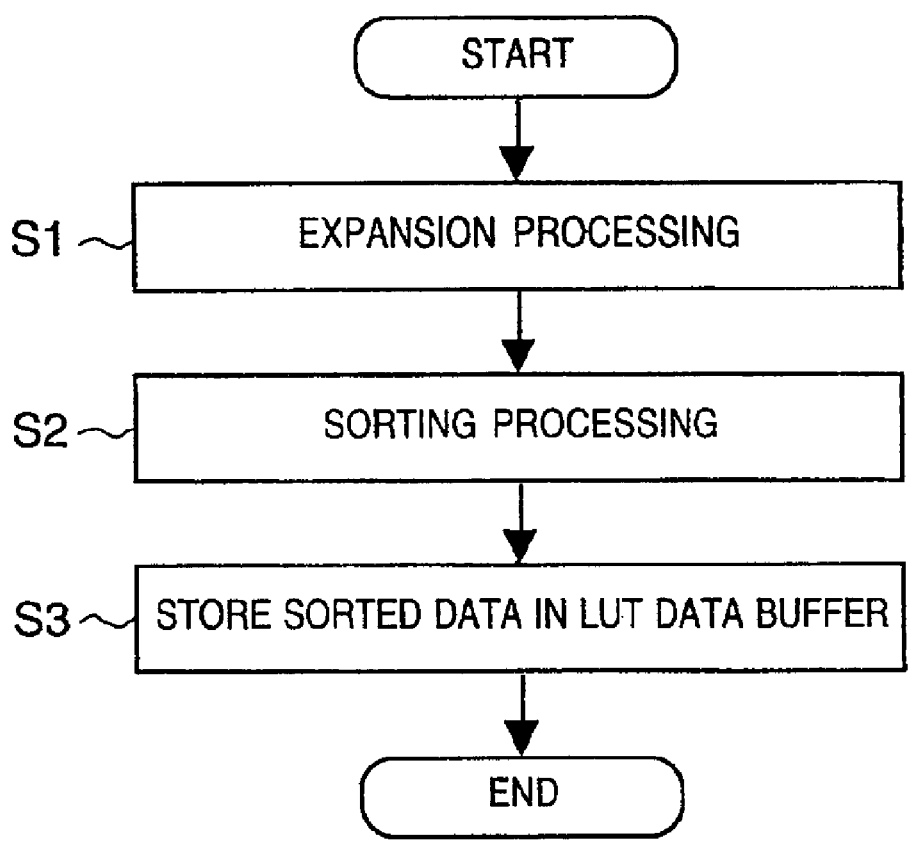
FIG. 5 is a flowchart showing a process executed by a data restoration unit.

FIG. 5 is a flowchart showing a process executed by the data restoration unit 101. In step S1, the compressed LUT data, which has been arranged as shown in FIG. 3 for efficient compression, is read out of the compressed data buffer 100 and expanded. In step S2, the expanded LUT data, which is arranged by color components in order of grid point numbers, is sorted as shown in FIG. 4. In step S3, the sorted data is stored in the LUT data buffer 102. For the LUT data compression method, for instance, the widely used Pack-bit method may be used, where data is compressed at a greater compression rate if the same data consecutively continues.

Herein, the LUT data stored in the compressed data buffer 100 is arranged by color components in order of grid point numbers as shown in FIG. 3. FIG. 3 shows that 125 bytes of each of the C, M, Y and K grid point data are compressed into i, j, k and m bytes respectively. More specifically, i<125, j<125, k<125, and m<125.

The advantage of arranging LUT data by color components in order of grid point numbers as shown in FIG. 3 is in that, for instance, with regard to the grid points 120 to 124 (see FIG. 2C), since this portion changes its color from simple yellow ((C, M, Y, K)=(0, the Y data has a value other than 0 while C, M and K data all have 0. Therefore, when the C, M and K data are arranged by color components in order of grid point numbers as shown in FIG. 3, the value 0 consecutively continues, thus improving the compression efficiency.

Generally, a portion where output image data is expressed by primary colors (cyan, magenta and yellow) and secondary colors (red, green and blue) contains no black component K. Therefore, at least K data is continuously 0. For instance, a portion which changes its color from red ((C, M, Y, K)=(0, 255, 255, 0)) to magenta ((C, M, Y, K)=(0, 255, 0, 0)) is expressed by M and Y data; thus, C and K data continuously have 0. Such tendency is not limited to color conversion by the complementary color inversion process or 100% UCR process, but occurs in other color conversion methods.

Therefore, when the LUT data is arranged by color components in order of grid point numbers and compressed, the chance of having continuous 0 data is increased. In other words, compared to a case of arranging LUT data by grid point numbers as shown in FIG. 4, i.e., C0, M0, Y0, K0, C1, M1, Y1, K1, C2, . . . . , the LUT data arrangement shown in FIG. 3 considerably improves the compression rate. Accordingly, the storage capacity of the compressed data buffer 101 where compressed LUT data is stored can be efficiently used.

In the above description, input color space is RGB color space and output color space is CMYK color space. However, the present embodiment is also applicable to CMYKcmy color space of a color inkjet printer capable of precise printing, which employs C, M, Y and K dark colors and c, m and y light colors. For instance, in a case where an image is formed in the CMYKcmy color space, high density of the image is expressed by dark C, M, Y and K ink while low density of the image is expressed by light c, m and y ink. Therefore, output image data for the high density portion mostly has 0 data for c, m and y colors, while output image data for the low density portion mostly has 0 data for C, M, Y and K colors. Thus, the LUT data in the CMYKcmy color space includes continuous 0 data more often than that in the CMYK color space, and the LUT data compression efficiency is further improved. According to the present embodiment, the LUT data compression efficiency can be improved not only in the case of CMYKcmy color space, but also in a case of performing color conversion into a color space inclusive of a large number of color components.

Moreover, in order to simplify the description, conversion from RGB color space into CMYK color space is performed by complementary color conversion (inversion) process and 100% UCR processing in the above description. However, any method of color conversion may be employed, i.e., the relation between input image data and output image data in each grid point may be anything.

Furthermore, an interpolation method of a conversion table for color conversion is not limited to cubic interpolation, but may be other interpolation methods using other shapes of interpolation medium, such as triangular prism interpolation or oblique triangular prism interpolation described in pages 347 to 350 in "The 1993, 24th Image Engineering Conference Papers", or tetrahedron interpolation disclosed in Japanese Patent Application Laid-open. No. 2-87192 or the like.

Moreover, LUT data stored in the compressed data buffer 100 is not limited to one table, but a plurality of compressed LUT data can be stored by providing the compressed data buffer 100 in a database form. Further, color space of input/output image data is not limited to RGB and CMYK, but may be YIQ, L*a*b*, XYZ color space or the like.

If output image data corresponding to input image data of each grid point is stored in unit of the grid point, the data buffer would include data arrays of different color components, which are less likely to have the same data consecutively. Thus, LUT data compression efficiency considerably declines. Furthermore, in a case of storing a plurality of LUT data as a LUT database, a problem arises in that a large capacity of the storage device is required. In comparison, according to the present embodiment, since output image data corresponding to input image data of each grid point is stored in unit of color component, the same data consecutively continues. Therefore, when performing conversion on image data by using LUT interpolation operation, LUT data compression efficiency is improved, and the storage capacity for storing LUT data can be saved.

[Second Embodiment]

Hereinafter, an image processing apparatus according to the second embodiment of the present invention is described. Note that in the second embodiment, with regard to components substantially the same as those of the first embodiment, the same reference numeral is assigned and detailed description thereof will be omitted.

The second embodiment describes a case where the image processing shown in the first embodiment is applied to a printer driver.

Printers used lately must be designed while taking into consideration of the fact that images are formed on print media having various characteristics, e.g., regular paper, gloss paper, gloss film and so forth. In order to realize excellent color reproducibility in such print media of various characteristics, it is necessary to prepare a LUT having conversion characteristics corresponding to each of these characteristics of the print media.

An image formed by a printer may include a plurality of objects, e.g., photographs, graphics or the like, whose preferable color reproduction method is different. For instance, tonality and color continuity are important for photographs, while reproduction of bright colors is important for graphics since bright colors are preferentially used in graphics.

Therefore, in order to output high quality images, LUTs having conversion characteristics suitable to the objects included in input images must be prepared. In other words, in order to obtain high quality output images from a printer, an extremely large amount of LUTs are necessary for various conditions. Furthermore, a plurality of LUTs must be used in single print operation.

Thus, the LUT data compression method described in the first embodiment is used to reduce the memory capacity necessary for storing a plurality of LUTs. In response to a print command, selected plurality of LUTs are expanded according to an image formation condition instructed manually by a user, thus enabling quick LUT switching.

FIG. 7 is a flowchart showing an example of the process according to the second embodiment. In step S21, a print command is inputted. For instance, a print command is inputted to a printer driver by giving print instruction to an application software by a user.

In step S22, a print medium data, indicative of the print medium on which an image is formed, is inputted. The print medium data is data corresponding to the type of print medium in default setting, or is selected by a user from a dialogue, which is one of the user interface of the printer driver displayed when the user instructs print operation. If the printer is capable of identifying the type of print medium, the data indicative of the identified type of print medium is used as the print medium data.

In step S23, a plurality of compressed LUT data corresponding to the inputted print medium data are read out of the compressed data buffer 100. The read plurality of compressed LUT data correspond to the print medium data and, for instance, plural types of objects. In step S24, each compressed LUT data is subjected to the process shown in FIG. 5 and the processed data is stored in the LUT data buffer 102.

In step S25, color conversion processing using a LUT is performed on the image data which is inputted subsequent to the print command. The color conversion processor 103 determines the type of object which belongs to the input image data by analyzing the input image data, and performs color conversion on the input image data using a LUT corresponding to the determination result.

As described above, according to the second embodiment, a plurality of LUTS, corresponding to a printing condition inputted along with a print command, are restored and stored in the LUT data buffer 102. Therefore, complicated color reproduction process which is suitable to the input image can efficiently be performed even when LUTs are stored in a compressed form.

[Third Embodiment]

Hereinafter, an image processing apparatus according to the third embodiment of the present invention is described. Note that in the third embodiment, with regard to components substantially the same as those of the first embodiment, the same reference numeral is assigned and detailed description thereof will be omitted.

The third embodiment describes a LUT changing process. For instance, a printer characteristic changes according to an environment and a passage of time. Thus, in order to always output high quality images by performing the image processing described in the first embodiment by a printer driver, it is necessary to change LUT data according to the changes in the printer characteristics.

The technique of changing LUT data includes calibration. LUT data generation by calibration is a technique of forming a plurality of color patches by a printer, measuring the obtained color patches, and generating LUT data based on the measurement.

In the third embodiment, the LUT data generated by calibration is stored in the compressed data buffer 100 by performing a reversed process of the process shown in FIG. 5. More specifically, LUT data shown FIG. 4, which is generated by calibration, is sorted by color components in order of grid point numbers and compressed, thereby forming compressed LUT data as shown in FIG. 3, and then stored in the compressed data buffer 100.

Note that the third embodiment is applicable not only to the LUT data changing process, but also to a LUT data addition process.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or the entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or the entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. An image processing apparatus for converting input color data to color component data, having a plurality of color component units, to be outputted by using a color conversion table, said apparatus comprising:

a first storage, arranged to store at least one compressed color conversion table, wherein data of the compressed color conversion table are arranged according to a sequential ordering of grid point numbers in each color component unit;

an expander, arranged to expand the compressed color conversion table;

a sorter, arranged to sort data included in the expanded color conversion table while a combination of output color components of a grid point is kept; and a converter, arranged to convert the input color data to the color component data using the expanded color conversion table.

2. The apparatus according to claim 1, further comprising a second storage arranged to store the expanded color conversion table.

3. The apparatus according to claim 1, wherein said converter converts color space.

4. The apparatus according to claim 1, wherein the color component data includes a black color component.

5. The apparatus according to claim 1, further comprising:

an input section, arranged to input a command indicative of print instruction and data indicative of a print medium characteristic; and a selector, arranged to select one of color conversion tables expanded by said expander in accordance with the data indicative of the print medium characteristic.

6. An image processing method of converting input color data to color component data, having a plurality of color component units, to be outputted by using a color conversion table, said method comprising the steps of:

expanding a compressed color conversion table, wherein data of the compressed color conversion table are arranged according to a sequential ordering of grid point numbers in each color component unit;

sorting data included in the expanded color conversion table while a combination of output color components of a grid point is kept; and converting the input color data to the color component data using the expanded color conversion table.

7. A computer readable medium storing computer-executable program code for executing the image processing method of claim 6.

8. A data processing method of compressing a color conversion table for converting input color data to color component data, having a plurality of color component units, said method comprising the steps of:

inputting data of the color conversion table where combinations of plural color component data are arranged by grid points;

sorting the data of the color conversion table so that the data are arranged in according to a sequential ordering of grid point numbers in each color component unit; and compressing the sorted color conversion table, wherein the compressed color conversion table is expanded and used in a color conversion process.

9. A computer readable medium storing computer program code for executing a data processing method of compressing a color conversion table for converting input image data to color component data, having a plurality of color component units, said product comprising process procedure codes for:

inputting data of the color conversion table where combinations of plural color component data are arranged by grid points;

sorting the data of the color conversion table so that the data are arranged according to a sequential ordering of grid point numbers in each color component unit; and compressing the sorted color conversion table, wherein the compressed color conversion table is expanded and used in a color conversion process.

* * * * *

UNITED STATES PATENT AND TRADEMARK OFFICE
CERTIFICATE OF CORRECTION

PATENT NO. : 6,992,783 B1
APPLICATION NO. : 09/342926
DATED : January 31, 2006
INVENTOR(S) : Kazuyoshi Sumiuchi It is certified that error appears in the above-identified patent and that said Letters Patent is hereby corrected as shown below:

COVER PAGE:
(57), ABSTRACT,
Line 9, "Then, color" should read -- Then, a color --; and
Line 10, "by interpolation" should read -- by an interpolation --.

COLUMN 4:
Line 34, "((C, M, Y, K)=(0, the" should read -- ((C, M, Y, K)=(0, 0, 255, 0)) to white ((C, M, Y, K)=(0,0,0,0)), only the --; and
Line 55, "C0, M0, Y0, K0," should read -- C0, M0, Y0, K0, --.

COLUMN 8:
Line 42, "in" should be deleted.

Signed and Sealed this

Nineteenth Day of December, 2006

JON W. DUDAS
*Director of the United States Patent and Trademark Office*